United States Patent [19]

Colak

[11] Patent Number: 4,922,158
[45] Date of Patent: May 1, 1990

[54] POLYCHROMATIC CRT WITH CRYSTALLINE SEMICONDUCTOR SCREEN

[75] Inventor: Selami Colak, Ossining, N.Y.

[73] Assignee: North American Philips Corporation, New York, N.Y.

[21] Appl. No.: 48,484

[22] Filed: May 1, 1987

Related U.S. Application Data

[63] Continuation of Ser. No. 565,681, Dec. 27, 1983, abandoned.

[51] Int. Cl.$^5$ ...................... H01J 29/52; H01J 29/10; H04N 9/27
[52] U.S. Cl. .................................. 315/383; 313/461; 313/463; 313/467; 358/72
[58] Field of Search ................. 315/383, 386; 313/461, 313/463, 466, 467, 474; 358/66, 71, 72

[56] References Cited

U.S. PATENT DOCUMENTS 3,582,960  6/1971  Hilborn et al. .................... 358/72
3,893,165  7/1975  Sunstein ........................... 358/71
4,453,179  6/1984  Peters et al. ...................... 358/72

Primary Examiner—Gregory G. Issing
Attorney, Agent, or Firm—Robert J. Kraus

[57] ABSTRACT

A polychromatic cathode ray tube includes a screen formed by a single layer of a crystalline semiconductor material which luminesces in visible light when excited by an electron beam. The color of luminescence is varied by modulating the heat energy imparted to the layer by the electron beam.

19 Claims, 3 Drawing Sheets

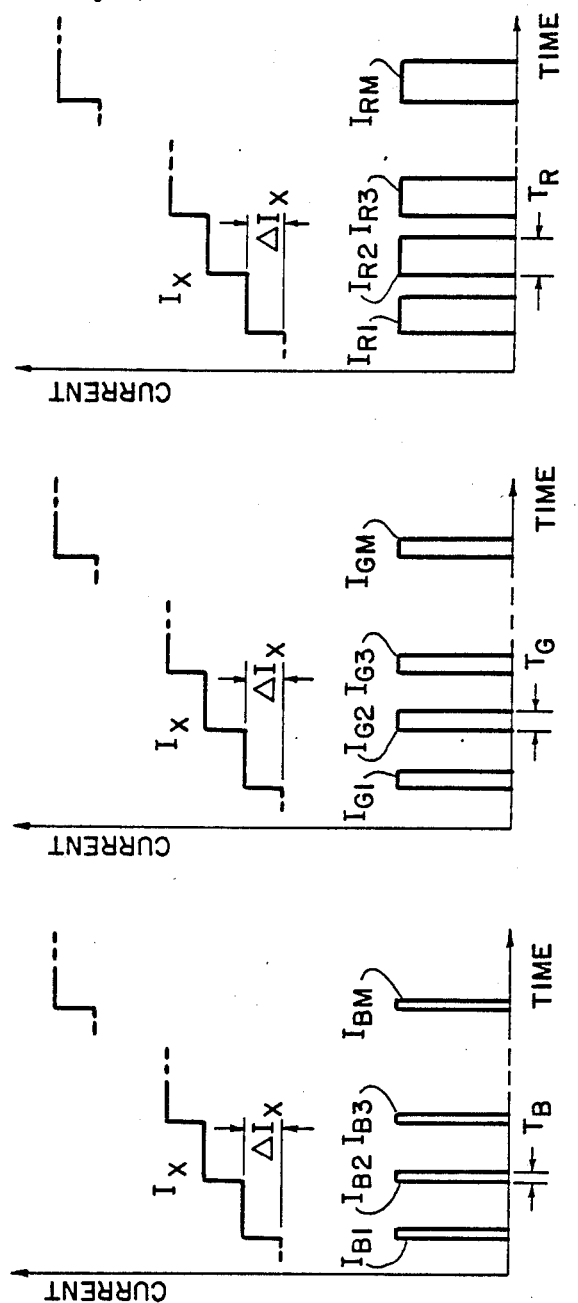

POLYCHROMATIC CRT WITH CRYSTALLINE SEMICONDUCTOR SCREEN

This is a continuation of application Ser. No. 565,681, filed Dec. 27, 1983, now abandoned.

BACKGROUND OF THE INVENTION

1. Field of the Invention

This invention relates to polychromatic cathode ray tubes, and in particular to cathode ray tubes which produce an image of varying color in response to variations in the energy imparted to a luminescent screen by a scanning electron beam.

2. Description of the Prior Art

One of the most commonly used polychromatic cathode ray tubes is the shadow mask color display tube. This tube produces images of generally adequate resolution and color accuracy, but both the image brightness and the electrical efficiency of the tube can be improved if the shadow mask is omitted. The shadow mask is provided with apertures which correspond to respective areas of the screen formed of red, green and blue luminescing phosphor materials, and these apertures permit only those portions of scanning electron beams designated red, green and blue which register with the respective color phosphor areas to pass through the mask. The mask not only limits the usable regions of the screen to those corresponding with the apertures, thereby limiting the brightness of the image, but also intercepts a large part of the electron beam current, thereby reducing the electrical power efficiency of the tube.

It is possible to eliminate the mask, to eliminate all but one electron beam, and to utilize virtually the entire screen area for image production by forming the screen from a phosphor material having a composition which differs with depth and which luminesces in different colors depending on the depth which the electrons in the beam penetrate into the screen. U.S. Pat. Nos. 3,371,153, 3,517,243 and 3,560,398 disclose color picture tubes having such penetration type screens which rely on control of the electron velocity to determine the depth of penetration. This velocity is controlled by varying the electron beam accelerating potential as the beam is scanned across the screen, effecting corresponding variations in the color of luminescence. The accelerating potential must be changed by several kilovolts to effect a color change, however, and the rate at which such large changes in voltages can be made is limited by the substantial capacitance of the picture tube's accelerating anode, which covers a large portion of the inner surface of the tube envelope. Although this problem might be avoided by maintaining the anode potential constant and varying the cathode potential over several kilovolts, as is disclosed in U.S. Pat. No. 3,863,097, it would then be difficult to prevent arcing between the cathode and other nearby conductors. Regardless of which electrode is utilized to control the accelerating potential, there remain the difficulties of accurately controlling the velocities of the electrons impinging on the screen and of manufacturing a screen having a composition which varies precisely with depth. The latter difficulty can be avoided by manufacturing the screen from a random mixture of different types of phosphor particles which luminesce in different colors and which are excited at different electron velocities, as is proposed in U.S. Pat. Nos. 3,339,016 and 3,522,368, but this still leaves the problems of rapidly changing the accelerating potential and of accurately controlling the velocities of impinging electrons.

In another type of maskless color display tube, disclosed in U.S. Pat. No. 2,431,088, a screen is formed from a mixture of phosphor materials, each of which luminesces in a different color and produces maximum light emission at a different beam current density. Although this type of tube avoids the difficulty of varying the high voltage accelerating potential and has a simple screen configuration, the use of current density to vary color causes other complications. If the beam current density is varied by varying the area of the beam spot on the screen, image resolution also varies. Resolution improves with decreasing spot size and worsens with increasing spot size. Thus a polychromatic image presented on the display tube screen has non-uniform resolution. Conversely, if the current density is varied by varying the beam current alternative means must be provided for controlling image brightness, which is itself typically controlled by varying the beam current.

The phosphors used to make the screens of prior art picture tubes generally include a powdered base compound to which a small quantity of an activator metal has been added for increasing luminous efficiency. Although some powdered phosphors luminesce efficiently without the use of activators, their use is generally limited to monochromatic displays such as oscilloscopes where a rapid decay of luminescence is desirable. Two phosphors commonly used for this purpose are zinc oxide and calcium tungstate.

Some crystalline semiconductor materials luminesce in visible light when continuously excited with low-energy electrons. Typical examples are $GaAs_xP_{1-x}$ light emitting diodes which luminesce in red, yellow or green, depending on the amounts of As and P, when current is passed through the diodes. It has also been reported by Zhong and Bryant, J. Phys. C: Solid State Phys., 15 (1982), pages 3411–3423 that zinc selenide (ZnSe) single crystals can be made into electroluminescent diodes which emit blue light varying in wavelength from approximately 4400–4700 Å as the temperature of the crystals is varied from approximately $-269°$ C. to $+20°$ C.

SUMMARY OF THE INVENTION

It is an object of the invention to provide an electrically efficient, high brightness, polychromatic cathode ray tube which is both simple to manufacture and simple to operate.

It is another object of the invention to provide a polychromatic cathode ray tube having a screen which can be simply produced without mixing different phosphor materials or varying the composition with depth.

It is still another object of the invention to provide a polychromatic cathode ray tube system in which the color of light emitted by the screen, in response to excitation by an electron beam, can be varied without varying the high voltage through which the electrons in the beam are accelerated.

It is yet another object of the invention to provide a method for producing a polychromatic image on a cathode ray tube screen consisting essentially of a single material.

These and other objects of the invention are accomplished by applicant's invention which is based on the use of a crystalline semiconductor layer screen. Applicant has determined experimentally that by utilizing an electron beam to excite a crystalline semiconductor layer disposed on a cathode ray tube faceplate, and by varying the thermal energy imparted to the layer by impinging electrons, the wavelength of luminescent light can be varied over the full range of the visible spectrum. The experiment was conducted with a crystalline layer of ZnSe, but it is clear that the wavelength of luminescent light emitted by any crystalline semiconductor material will vary somewhat as the thermal energy imparted by an exciting electron beam is varied. The temperature dependency of the wavelength of radiation emitted by excited semiconductors is well known. The bandgap energies decrease, and thus the wavelengths of radiation emitted increase, with increasing temperature. For example, S. M. Sze, *Physics of Semiconductor Devices,* 2nd Edition, Wiley Interscience Publication (981) page 15 reports test results for pure gallium arsenide, silicon and germanium showing substantial bandgap variations as the temperature of each of these pure crystalline semiconductor materials is varied from absolute zero ($-273°$ C.) to temperatures above $150°$ C., $600°$ C. and $600°$ C., respectively. None of these emissions are in the spectrum visible to the human eye, however, and such extreme low temperatures are not possible in a practical cathode ray tube. Screen materials usable in practicing the invention are therefore limited to crystalline semiconductor materials which luminesce in visible light at screen temperatures obtainable by electron beam excitation in a cathode ray tube.

In accordance with applicant's invention, a polychromatic cathode ray tube includes a screen formed by providing on the inner surface of the tube's faceplate a layer of a crystalline semiconductor material which luminesces in visible light when excited by an electron beam produced by an electron gun situated in the tube. Color variation is achieved by controlling the deflection and the current of the electron beam to heat selected areas of the screen to temperatures corresponding to predefined colors.

In one embodiment of the invention, the electron beam is repeatedly deflected across each selected area of the screen at a predetermined repetition rate which heats the area to the temperature corresponding to a predefined color for that area. This embodiment is particularly useful in systems employing a vector stroke display device, such as in high resolution computer controlled graphics systems. (See *Electronic Design,* Aug. 16, 1980, pages 123-127.)

In another embodiment the electron beam is raster scanned across the entire screen, line-by-line, and as it passes across selected areas the lineal rate of travel of the beam is adjusted to effect heating of each area to the temperature corresponding to a predefined color for that area. The lineal rate of travel determines the time during which the beam imparts heat energy to individual semiconductor crystals in the area, and thus the temperature of these crystals during the short luminescing period after the beam leaves the area. The lineal rate of travel of the beam across each area can be varied in a number of ways, but preferably this is accomplished by wobbling the beam by means such as that disclosed in U.S. Pat. No. 3,030,439 whereby the wobble amplitude is modulated for the purpose of deflecting the beam to bands of different phosphor materials. In accordance with the invention, however, the wobble amplitude is modulated to establish a predetermined lineal path length as the beam travels across each area of the screen. Thus, the lineal rate of travel of the beam may be adjusted on an area-by-area basis by maintaining constant the time period taken by the beam to cross an area of given width and by varying the lineal path length travelled by the beam during this time period. Alternatively, this time period may be varied on an area-by-area basis and the path length held constant, or both time period and lineal path length can be varied. Any variation in the time period, however, must be regulated such that the maximum time required for the beam to cross the entire viewable screen does not exceed the time allotted for the beam to scan a single raster line.

In yet another embodiment the electron beam is stepped across the screen to successive spots, each defined by the beam cross section. At each spot the beam is pulsed for a period of sufficient duration to locally heat the screen to the temperature corresponding to a predefined color for a selected area containing one or more spots. This technique can be utilized in both vector stroke and raster scan systems. It is particularly advantageous, however, in small screen raster scan systems where the small distances between adjacent scan lines limits the allowable wobble amplitude.

Brightness of the image produced on the screen is preferably controlled by modulating the electron beam current. Varying the electron beam current magnitude causes corresponding brightness variations without substantially affecting image color, because changes in the rate of travel of the electron beam across each screen area has a much greater heating effect on the temperature of the screen material in this area than a change in the beam current. In a preferred method for controlling image brightness even small changes in color can be avoided by maintaining the magnitude of the electron beam current constant and pulsing the beam as it is deflected across the screen. Pulsing effectively removes or dims microscopic portions of the luminescent image, and causes an apparent change in image brightness as perceived by the human eye.

BRIEF DESCRIPTION OF THE DRAWING

Exemplary embodiments of the invention will now be described in detail with reference to a drawing in which:

FIGS. 5A, 5B and 5C are waveshapes of electron beam currents and deflection coil currents in accordance with another embodiment of the invention.

DESCRIPTION OF THE PREFERRED EMBODIMENTS

Figure 1:
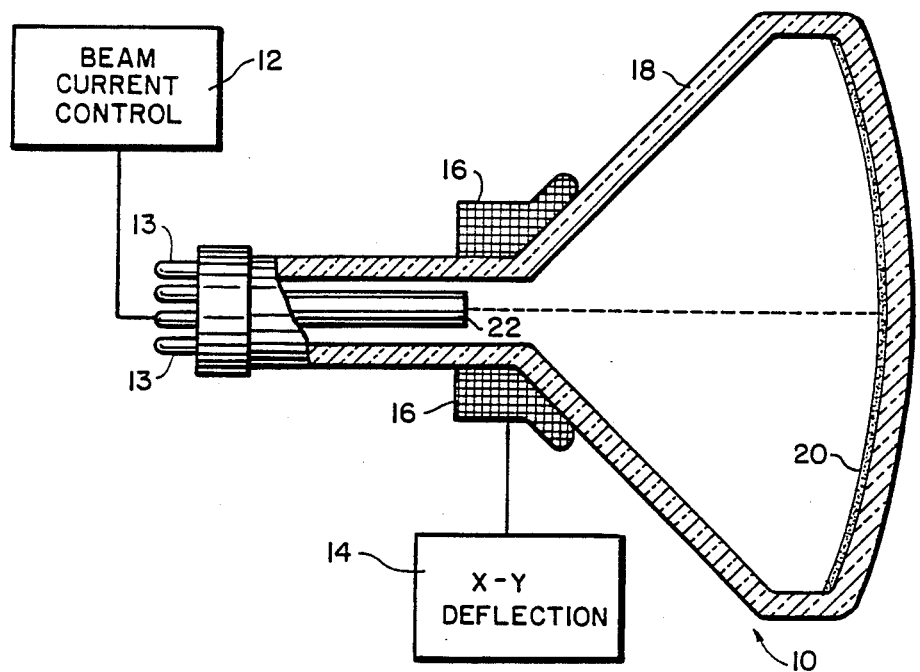
FIG. 1 is a longitudinal sectional view of a color display tube system in accordance with the invention.

FIG. 1 is a general illustration of a color display system in accordance with applicant's invention. The system includes a cathode ray tube 10 for producing a polychromatic image, beam current control circuitry 12 electrically-connected to one or more conductive pins 13 in the tube's neck portion, and X-Y deflection circuitry 14 electrically-connected to deflection coils 16 disposed around the tube for deflecting the beam. The tube itself is largely conventional and includes an evacuated glass envelope 18 having a faceplate which is covered on its inner surface with a luminescent screen 20. An electron gun 22, also electrically-connected to one or more of the pins 13, is disposed within the neck portion of the envelope for producing an electron beam directed at the screen. To enable maximum heating of the screen the gun should be capable of focusing the beam to a small spot size, such as a spot having a diameter of 50 micrometers.

The screen 20 consists essentially of a layer of a crystalline semiconductor material which luminesces in visible light when excited by the electron beam. The layer includes one or more adjacent wafers of the semiconductor material, which are affixed to the inner surface of the faceplate by means of an adhesive. The wafer thickness and the type of adhesive are not critical, but a 50 micrometer thick wafer affixed to the faceplate of a CRT by an epoxy adhesive sold under the name and number EPO-TEK 301-2, which was cured for two hours at about 100° C., produced good results. In picture tubes having small flat faceplates, such as those used in projection systems, a single wafer might be sufficiently large to form the entire screen. As an alternative to using wafers, the layer of crystalline semiconductor material can be produced by depositing the semiconductor material onto a transparent substrate, crystallizing the deposited material by electron beam or laser beam annealing, and then affixing the substrate to the inner surface of the faceplate. It might also be possible to grow the crystalline semiconductor layer directly on the faceplate, depending on the compositions of the layer and the faceplate.

Virtually any crystalline semiconductor material which luminesces in visible light can be utilized to form a screen which will luminesce in perceptibly different colors, but Table 1 illustrates the extensive color shift readily obtainable by utilizing ZnSe material. The data in Table 1 describes the approximate wavelengths of blue, green and red light emitted by a ZnSe screen when the heat energy imparted by an electron beam exciting the screen is adjusted to different levels. This data was obtained by repeatedly sweeping an electron beam across a small area of a ZnSe wafer affixed to the inner surface of a cathode ray tube faceplate. In all instances a 1.5 milliamp beam was accelerated through 25 kev. and focused to obtain a 200 micrometer spot size on the screen.

TABLE 1

| Wavelength (Å) | 4600–4900 blue | 5000–5500 green | 5000–5500 green | 6000–6500 red | 6000–6500 red |
| --- | --- | --- | --- | --- | --- |
| Sweep Distance (cm) | 1.0 | 1.0 | 0.5 | 1.0 | 0.1 |
| Sweep Time ($\mu$ sec.) | 10 | 10 | 10 | 10 | 10 |
| Repetition Rate (sweeps/sec.) | 100 | 200 | 100 | 500 | 100 |

The wavelengths listed in Table 1 were estimated by visually comparing the observed color to a color chart. In other experiments utilizing a spectrum analyzer the wavelength of luminescent radiation was accurately measured as varying continuously from 4500 Å to 5550 Å as the repetition rate of the sweeping beam was adjusted. Because of limitations in the testing arrangement, the wavelengths in the red band were not measured.

Because excited crystalline semiconductors are generally known to emit luminescent radiation of continuously increasing wavelengths as their temperatures are increased, all crystalline semiconductors which emit such radiation in the lower wavelengths of the visible spectrum can be expected to emit light radiation which varies in wavelength across a substantial portion of the visible spectrum as their temperatures are increased by heat transfer from an impinging electron beam. Any crystalline semiconductor which emits light in the blue part of the spectrum, when at room temperature, potentially can be made to emit light across the entire visible spectrum. Examples of semiconductor materials which produce room temperature (27° C.) emissions on either side of that produced by ZnSe (4700 Å) are CdS (5200 Å) and $ZnS_{0.15}Se_{0.85}$ (4300 Å).

Figure 2A:
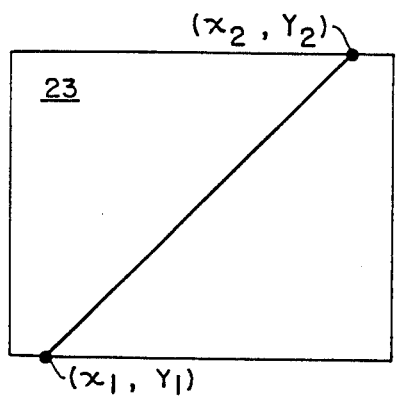
FIGS. 2A and 2B are representations of luminescent electron beam traces across a small area of a crystalline semiconductor screen in accordance with a vector stroke embodiment of the invention.
Figure 2B:
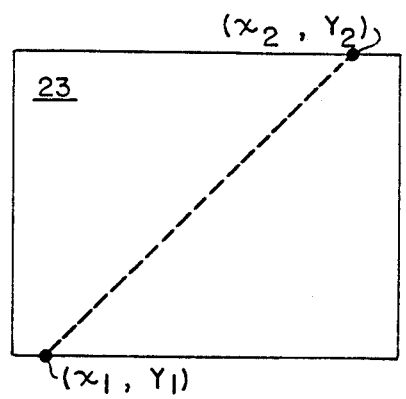

Referring to FIGS. 1, 2A and 2B, a vector stroke display device in accordance with one embodiment of the invention will be described. In a vector stroke type of display device the deflection circuitry 14 varies the currents through the deflection coils 16 effecting deflection of the electron beam such that an image is drawn on the screen 20 stroke-by-stroke. The circuitry 14 includes a vector processor for producing analog X and Y deflection signals from a digitally encoded vector list. This list, which also includes brightness data bits, is stored in the processor memory and can be changed at will. The brightness of the image is controlled by forming a digital BRIGHTNESS signal from the brightness data bits and applying the BRIGHTNESS signal to the beam current control circuitry 12 simultaneously with the production of corresponding X and Y deflection signals. The beam current control circuitry includes a switching amplifier which applies pulses to the electron gun in response to the digital BRIGHTNESS signal received from the processor. The electron gun produces corresponding electron beam pulses having an amplitude determined by the amplitude of the pulses applied by the switching amplifier.

FIG. 2A is an enlarged view of a segment of a single luminescent stroke produced on a small area 23 of the screen 20 by the above-described device when operating at maximum brightness. The location of the stroke on the screen is defined in the vector list by the end point coordinates $(x_1, y_1)$, $(x_2, y_2)$ and by the coordinates of all points lying between the end points. The color of the stroke is determined by both the rate at which these coordinates are sequentially read from the vector list and by the repetition rate at which the stroke is refreshed by re-reading the coordinates. The brightness of the stroke is determined by the brightness data stored in the vector list. To obtain the maximum brightness stroke illustrated in FIG. 2A, a logical ONE brightness data bit is included on the vector list for each of the coordinates along the line segment, causing the production of an electron beam pulse at each coordinate position along the stroke. FIG. 2B is an enlarged view of a stroke segment having the same color and coordinates as that in FIG. 2A, but which appears to have lower brightness. Lower apparent brightness is produced by merely changing to a logical ZERO the brightness data bit for every $n^{th}$ coordinate on the vector list. The apparent brightness is decreased by decreasing n.

Figure 3:
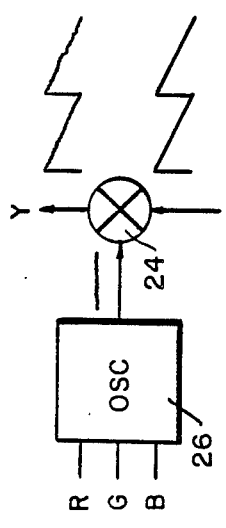
FIG. 3 is a schematic representation of beam motion modulation circuitry which may be used in a raster scan embodiment of the invention.

Referring to FIGS. 1, 3, 4A and 4B, a raster scan display device in accordance with an embodiment of the invention will be described. In a raster scan type of display device, the deflection circuitry 14 varies the currents through the deflection coils 16 effecting repeated deflection of the electron beam horizontally across the screen such that an image is drawn by sequentially-produced horizontal lines. The circuitry 14 produces analog X and Y deflection signals from horizontal and vertical deflection signals and red, green, blue (R, G, B) color signals commonly produced in color television receivers and monitors. The X deflection signal, which effects horizontal deflection of the electron beam at a constant rate of motion to trace each of the horizontal lines, corresponds to the horizontal deflection signal. The circuitry 14 includes means for modulating the Y deflection signal such as a mixer 24 and a constant frequency oscillator electrically-connected as illustrated in FIG. 3. The modulated Y deflection signal is produced by applying the vertical deflection signal and a wobble signal to the mixer 24. The wobble signal itself is produced by the constant frequency oscillator 26. The magnitude of the wobble signal is determined by the R, G, B color signals which are applied to respective inputs of the oscillator. The modulation of the vertical deflection signal causes the vertical wobble of the electron beam which effects the variation in the luminescent color as the beam is scanned across the screen, as is more fully explained in conjunction with the description of FIGS. 4A and 4B.

The brightness of the image is also controlled in this embodiment by applying a digital BRIGHTNESS signal to the beam current control circuitry 12 simultaneously with production of the X and Y deflection signals. However, the BRIGHTNESS signal in this embodiment is formed from the analog LUMINANCE signal commonly produced in color television receivers and monitors. This analog signal is converted to a serial stream of digital pulses by an analog-to-digital converter (not shown) and then applied to the circuitry 12 as the BRIGHTNESS signal. The circuitry 12 and the electron gun 22 respond to these pulses in the same way as previously described for the vector scan embodiment.

Figure 4A:
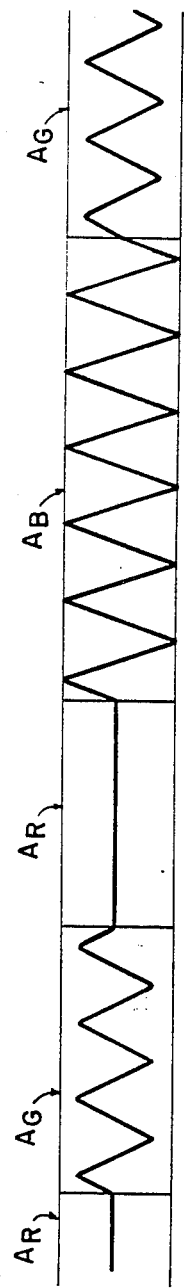
FIGS. 4A and 4B are representations of luminescent electron beam traces across small areas of a crystalline semiconductor screen in accordance with the above-mentioned raster scan embodiment of the invention.

FIG. 4A is an enlarged view of a segment of a single luminescent line produced on the screen by the scanning electron beam when operating at maximum brightness. The color of the line is determined by the amplitude of the wobble modulation, which is shown as sawtooth modulation but could just as well be sinusoidal, square wave or any other repetitious waveform. On a screen having a 46 centimeter (18 inch) diagonal measurement, a beam having a 50 micrometer spot size can be wobbled vertically within a band over 500 micrometers high without interfering with the luminescent lines in similar bands above and below. By successively changing the wobble amplitude within successive areas of the band, the beam's lineal rate of travel across the areas (and thus the color of luminescence) is successively changed. In the areas designated $A_R$, where zero wobble modulation is applied, the electron beam travels at the slowest possible lineal rate (the horizontal scan rate) effecting maximum heating of the screen material, and these areas luminesce in a red color. In the areas designated $A_G$, where moderate wobble modulation is applied, the electron beam must travel at a faster lineal rate to cover the greater lineal distance per unit of horizontal scan distance, effecting less heating of the screen material and causing these areas to luminesce in a green color. In the area designated $A_B$, where maximum wobble modulation is applied, the electron beam must travel still faster to cover an even greater lineal distance per unit of horizontal scan distance, effecting even less heating of the screen material and causing this area to luminesce in a blue color. The amplitude of the modulation can also be changed to magnitudes between those shown to produce colors having wavelengths between those for the red, green and blue luminescent colors.

Figure 4B:
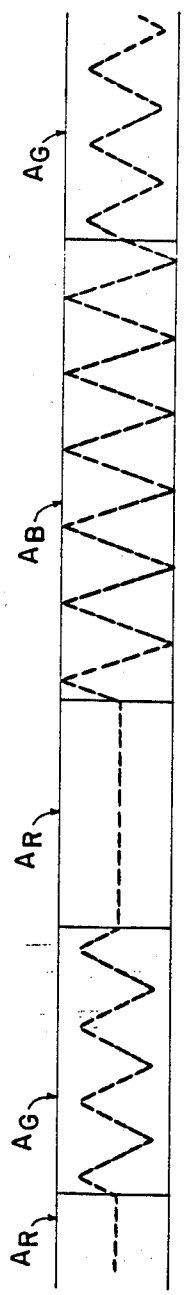

FIG. 4B illustrates a lower brightness version of the same luminescent line segment shown in FIG. 4A. When a LUMINANCE signal representing maximum brightness is received by the analog-to-digital converter (not shown) producing the BRIGHTNESS signal, the BRIGHTNESS signal produced includes a virtually continuous series of pulses which are applied to the beam current control circuitry 12. This causes the electron gun to produce a corresponding series of beam current pulses, resulting in a virtually unbroken luminescent trace. When a LUMINANCE signal representing lower brightness is received, the analog-to-digital converter produces fewer pulses causing the electron gun to produce fewer beam current pulses, resulting in a broken luminescent trace of lower apparent brightness.

FIGS. 5A, 5B, 5C are plots of beam currents and X-deflection coil currents versus time in an embodiment of the invention where the electron beam is horizontally stepped across the screen to produce successive luminescent spots where the beam is pulsed for a period of sufficient duration to locally heat the screen to the temperature corresponding to a predefined color for that spot. The currents are not shown to scale, but demonstrate the horizontal positional relationships of the spots and the duration of the beam pulse at each spot.

Referring to FIG. 5A, beam current pulses $I_{B1}, I_{B2}$ ... $I_{Bm}$ produce m adjacent blue spots at horizontally displaced positions. The blue color of the spots is established by pulsing the electron beam for a predefined time period $T_B$, thereby heating the spot to a temperature at which it emits blue light. The brightness of the image portion formed by the m adjacent spots is determined by the distance between the spots, which in turn is determined by the height $\Delta I_x$ of each step in the X-deflection coil current $I_x$.

Alternatively, it is possible to control image brightness by adjusting the amplitude of the beam current pulse producing each spot, thereby determining the individual brightnesses of the spots.

To simplify the presentation in FIGS. 5A, 5B, 5C, the Y-deflection coil current is not shown and is assumed to be constant during the production of the illustrated pulses, so no vertical displacement will occur. Thus the image portion produced by the pulses $I_{B1}, I_{B2} \ldots I_{Bm}$ will be a horizontal blue line segment having a length determined by both the number m of adjacent spots and by the distance corresponding to $\Delta I_x$.

FIGS. 5B and 5C are plots of the stepped X-deflection coil current $I_x$, and of beam current pulses $I_{G1}, I_{G2} \ldots I_{Gm}$ and $I_{R1}, I_{R2} \ldots I_{Rm}$ which will produce adjacent green spots and red spots, respectively, in the same horizontal positions on the screen as the blue spots produced by the currents depicted in FIG. 5A. The only difference in the currents depicted in the three plots is the durations of the beam current pulses, with the short, intermediate and long pulse durations $T_B$, $T_G$ and $T_R$ effecting the production of blue, green and red spots, respectively. This spot-by-spot technique for producing different colors enables production of a very high resolution image formed by individual spots of any color, each having an area as small as that which can be produced by state-of-the-art electron guns. This embodiment is particularly useful in small screen CRT systems where there are severe limitations in the distance over which the electron beam can be wobbled to produce color variations.

The above-described exemplary embodiments clearly illustrate how the invention can be employed to construct and operate a simple, maskless color picture tube which can be utilized in existing color picture tube systems with minimum modifications of the systems. The screen of the picture tube is formed from a single semiconductor layer rather than from a composite of different phosphor materials, does not require any change in the electron beam accelerating voltage to change the luminescent color, and can be operated by making use of existing color and LUMINANCE signals in conventional picture tube systems.

Although the invention has been described with reference to specific embodiments, many alternative embodiments are possible. For example, a beam wobbling system can be constructed in which the luminescent color is varied by modulating the wobble frequency, either exclusively or in combination with the amplitude. Increasing the beam wobble frequency also increases the lineal path length traversed by the electron beam and thus decreases the wobble amplitude needed to obtain a particular lineal rate of travel. Frequency modulation is particularly advantageous with smaller screens having closer scan lines and correspondingly narrower bands limiting the vertical distance over which the beam can be deflected without interfering with adjacent bands. It should also be noted that the desired colors of different portions of an image need not be produced directly, by heating these portions of the screen to corresponding temperatures, but can also be produced by more conventional dot integration techniques. For example, adjacent red, green and blue areas or spots would be integrated by the human eye and appear as a white portion of an image. It is also possible to rapidly produce successive red, blue and green images which will be integrated by the eye to appear as a polychromatic image.

I claim:

1. A polychromatic cathode ray tube system comprising:
    (a) a cathode ray tube including an envelope having a faceplate, a screen disposed on the faceplate's inner surface, and an electron gum situated in the envelope for producing an electron beam directed at the screen,
    said screen comprising a layer consisting essentially of a crystalline semiconductor material which luminesces at a wavelength which varies continuously in the visible light spectrum with a corresponding variation in an electron-beam-excitation-controlled temperature; and
    (b) beam control means coupled to the tube for controlling the deflection and the current of the beam to excite selected areas of the screen,
    said beam control means being adapted to respond to a color control signal representing predefined colors of the areas to effect heating of the selected areas to temperatures at which they luminesce in the predefined colors, and being adapted to respond to a brightness signal representing predefined brightness levels of the areas to effect luminescence of the selected areas at the predefined brightness levels.

2. A polychromatic cathode ray tube system comprising:
    (a) a cathode ray tube including an envelope having a faceplate, a screen disposed on the faceplate's inner surface, and an electron gun situated in the envelope for producing an electron beam directed at the screen,
    said screen comprising a layer consisting essentially of a crystalline semiconductor material which luminesces at a wavelength which varies continuously in the visible light spectrum with a corresponding variation in an electron-beam-excitation-controlled temperature; and
    (b) beam control means coupled to the tube for controlling the deflection and the current of the beam to excite selected areas of the screen, said beam control means including:
        (1) deflection means, coupled to the tube, for deflecting the electron beam to the selected areas, said deflection means being adapted to modulate the motion of the beam in response to a color control signal representing predefined colors to effect heating of the selected areas to temperatures at which said area luminesce in said predefine colors; and
        (2) beam current control means, electrically-connected to the electron gun, for modulating the electron beam current in response to a brightness signal representing predefined brightness levels of the selected areas to effect luminescence of said selected areas at said predefined brightness levels.

3. A polychromatic cathode ray tube system as in claim 2 where the beam current control means effects pulsing of the beam current, in response to the brightness signal, as the beam is deflected.

4. A polychromatic cathode ray tube system as in claim 3 where the beam current control means effects production of beam current pulses of equal amplitude and having a repetition rate which varies in response to the brightness signal.

5. A polychromatic cathode ray tube system comprising:
    (a) a cathode ray tube including an envelope having a faceplate, a screen disposed on the faceplate's inner surface, and an electron gun situated in the envelope for producing an electron beam directed at the screen,
    said screen comprising a layer consisting essentially of a crystalline semiconductor material which luminesces at a wavelength which varies continuously in the visible light spectrum with a corresponding variation in an electron-beam-excitation-controlled temperature; and
    (b) beam control means coupled to the tube for controlling the deflection and the current of the beam to excite selected areas of the screen, said beam control means including:
        (1) deflection means, coupled to the tube, for deflecting the electron beam to the selected areas to produce at least one luminescent spot in each of said areas; and
        (2) beam current control means, electrically-connected to the electron gun, for controlling the electron beam current in response to a color control signal representing predefined colors by effecting production of a beam current at each spot for a duration which effects heating of the spot to the temperature at which the spot luminesces in the predefined color for the respective area.

6. A polychromatic cathode ray tube system as in claim 1, 2 or 5 where the layer consists essentially of crystalline ZnSe.

7. A polychromatic cathode ray tube system as in claim 1, 2 or 5 where the layer consists essentially of crystalline $ZnS_xSe_{1-x}$.

8. A polychromatic cathode ray tube system as in claim 7 where the layer consists essentially of crystalline $ZnS_{0.15}Se_{0.85}$.

9. A polychromatic cathode ray tube systems as in claim 1, 2 or 5 where the layer consists essentially of crystalline CdS.

10. A method for operating a polychromatic cathode ray tube including an envelope, having a faceplate, a screen disposed on the faceplate's inner surface, and an electron gun situated in the envelope for producing an electron beam directed at the screen, said screen comprising a layer consisting essentially of a crystalline semiconductor material which luminesces at a wavelength which varies continuously in the visible light spectrum with a corresponding variation in an electron-beam-excitation-controlled temperature, said method comprising controlling the deflection and the current of the beam to effect heating of selected areas of the screen to temperatures at which they luminesce in predefined colors, and to effect luminescence of said selected areas at predefined brightness levels.

11. A method as in claim 10 comprising modulating the motion of the beam to effect heating of the selected areas to said temperatures, and modulating the beam current to effect luminescence of the selected areas at the predefined brightness levels.

12. A method as in claim 11 wherein the beam current is pulsed as the beam is deflected to effect luminescence of the selected areas at the predefined brightness levels.

13. A method as in claim 12 where the pulses are of equal amplitude and have a repetition rate which determines the brightness levels.

14. A method as in claim 10 where the electron beam draws an image on the screen stroke-by-stroke in response to deflection signals produced from a digitally-encoded vector list designating each stroke's coordinates and color, each stroke being repeatedly drawn at a repetition rate which effects heating of a selected area of the screen to the temperature at which it luminesces in the predefined color.

15. A method as in claim 10 where the electron beam raster scans the screen line-by-line, the motion of the beam being modulated to effect said heating of the selected areas by varying the lineal rate of travel of the beam across the screen.

16. A method as in claim 15 where the lineal rate of travel of the beam is varied by wobbling the beam in a direction transverse to the direction in which it is scanned.

17. A method as in claim 16 wherein the wobble amplitude is modulated to vary the lineal rate of travel of the beam.

18. A method as in claim 16 where the wobble frequency is modulated to vary the lineal rate of travel of the beam.

19. A method as in claim 10 where the electron beam is deflected to the selected areas to produce at least one luminescent spot in each of said areas, and where the electron beam current is produced at each spot for a duration which effects heating of the spot to the temperature at which the spot luminesces in the predefined color for the respective area.

* * * * *